Patented Aug. 21, 1923.

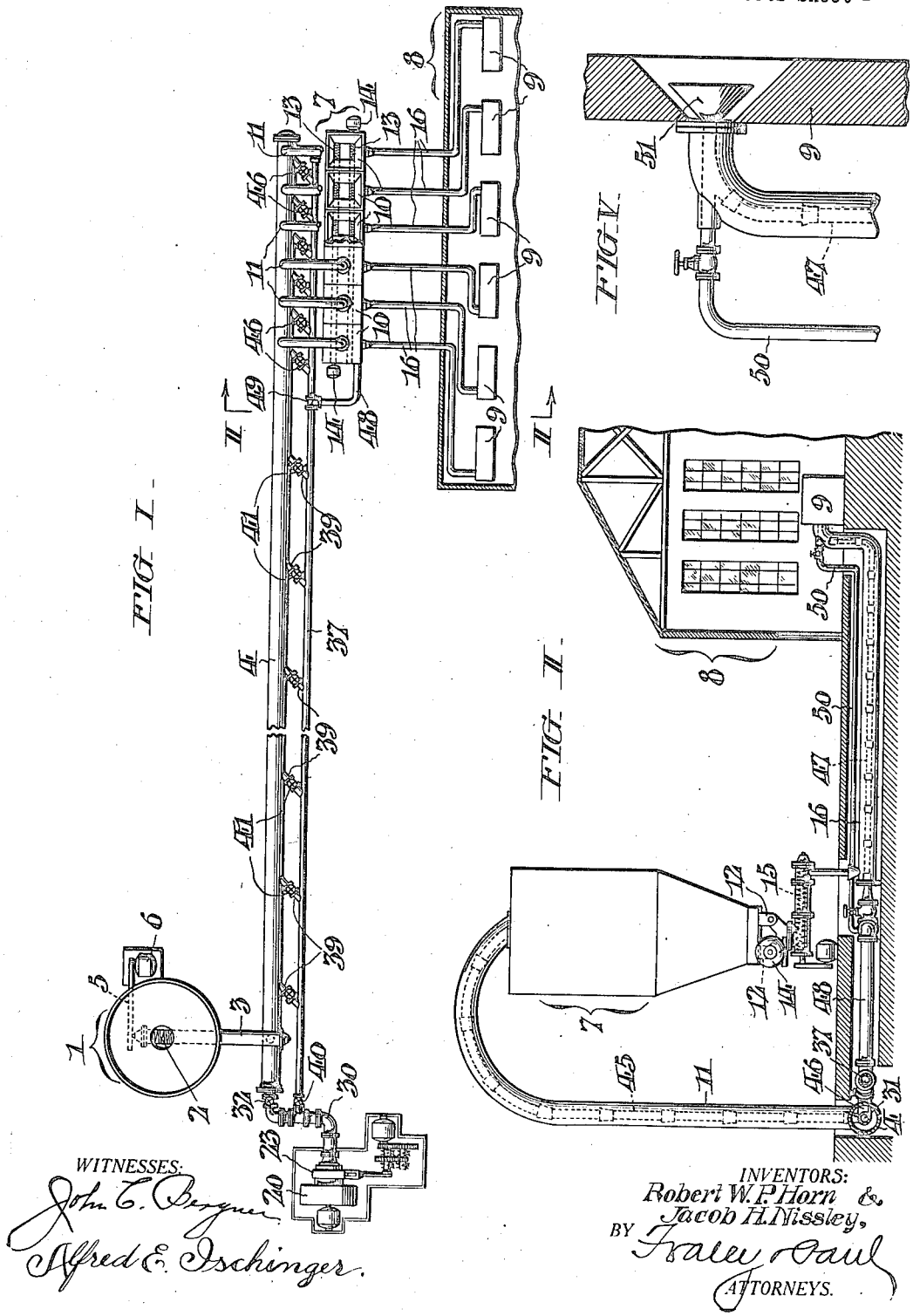

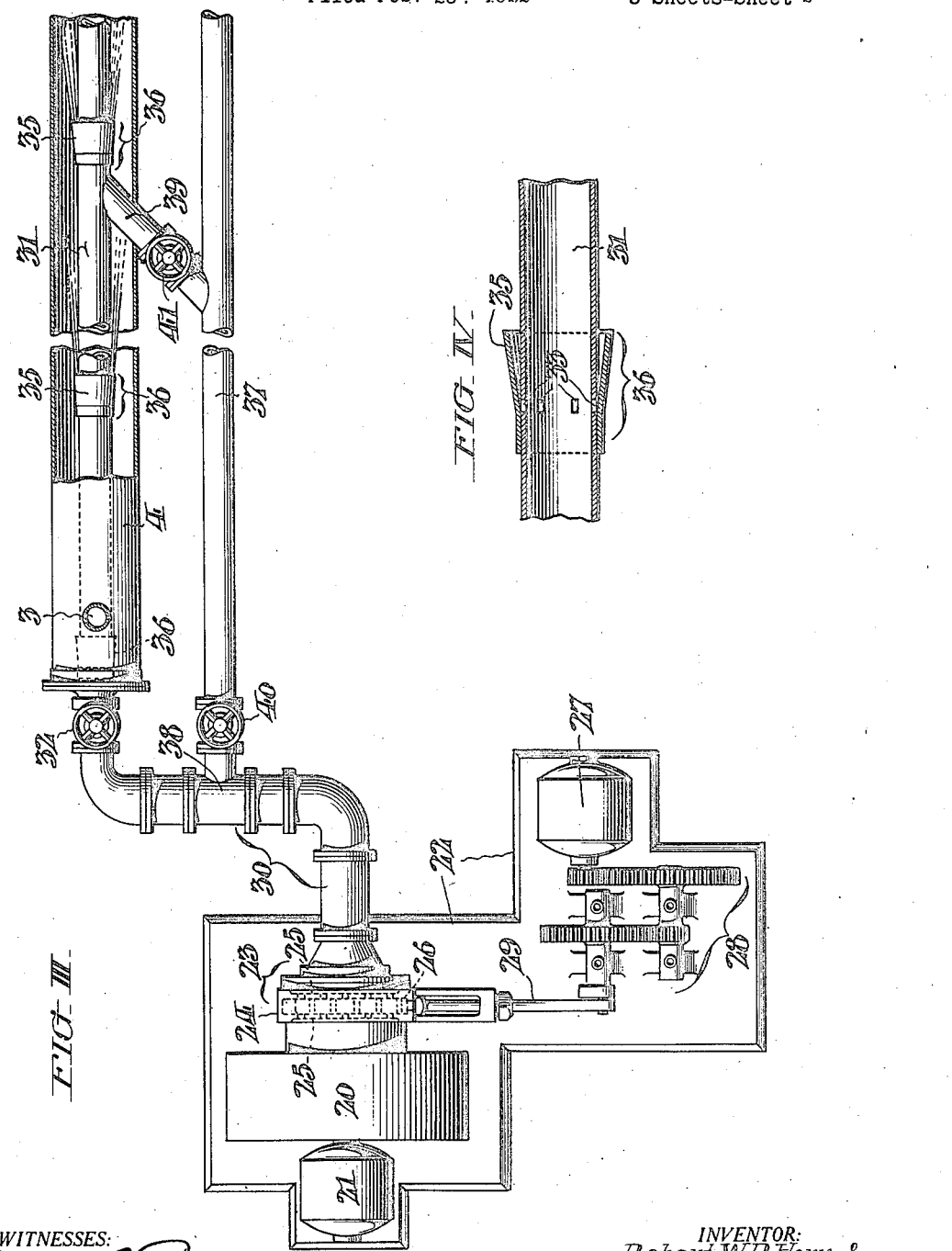

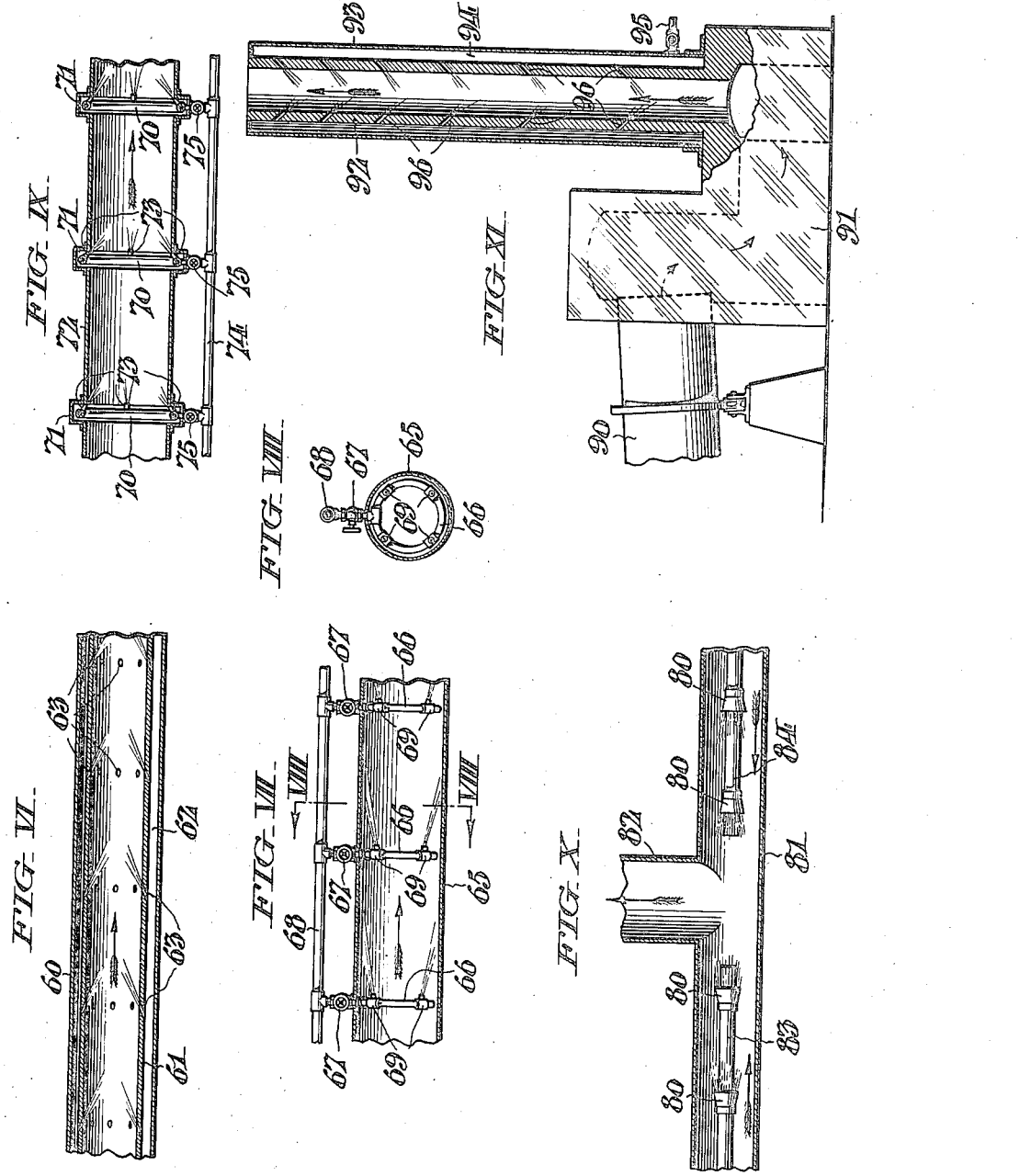

1,465,269

UNITED STATES PATENT OFFICE.

ROBERT W. P. HORN, OF ALLENTOWN, AND JACOB H. NISSLEY, OF MANHEIM, PENNSYLVANIA.

METHOD OF AND SYSTEM FOR CONVEYING.

Application filed February 25, 1922. Serial No. 539,181.

*To all whom it may concern:*

Be it known that we, ROBERT W. P. HORN and JACOB H. NISSLEY, citizens of the United States, residing at Allentown, in the county of Lehigh and State of Pennsylvania, and Manheim, in the county of Lancaster and State of Pennsylvania, have invented certain new and useful Improvements in the Methods of and Systems for Conveying, whereof the following is a specification, reference being had to the accompanying drawings.

Our invention relates to methods of conveying pulverulent or finely comminuted materials such as powdered coal, cement, flour, saw dust, water or other liquids, or combinations of gases and finely comminuted solids. Our invention also relates to apparatus or systems by use or aid of which such methods may be practiced.

The chief object of our invention is to effect transfer or conveyance of materials such as above enumerated through conduit systems at constant velocity, pressure and temperature. This we are able to accomplish by aid of compressed air or other gaseous fluids intermittently discharged preferably at a steady frequency and released, at intervals lengthwise of the conduit, in longitudinally directed, conical blasts, so that the materials are progressively transferred from one to another of the zones between the points of air discharge and with an undulatory or wave-like motion through the system. The basic or underlying principle of our invention may also be utilized to advantage in controlling the flow of finely comminuted solids to effect their separation from admixture with gases in the course of passage through a conduit. One example of such use is in separating dust from the products of combustion in smoke stacks.

Other objects and attendant advantages will become readily apparent from the following detailed description of various typical embodiments of our invention.

In the drawings, Fig. I is a plan view, more or less diagrammatically represented, of a powdered coal burning metallurgical smelting plant, and, in association, a conveying system for the puverulent fuel conveniently embodying our invention.

Fig. II is a cross section of the organization on a larger scale, viewed in the direction of the arrows II—II in Fig. I.

Fig. III is a plan view of the air compressor, pulsator, included in the system, and a portion of the conduit through which the powdered fuel is conveyed.

Fig. IV is a detail axial section through a portion of the air pipe within the conduit showing the construction of one of the blast nozzles.

Fig. V is a detail sectional view showing a form of nozzle whereby the pulverized coal is forcibly injected into the smelting furnaces.

Figs. VI to IX, inclusive, are detail views of various modifications of conduits, each affording advantages for special cases of application; and Figs. X and XI suggest two other practical applications of the basic principle of our invention.

Referring first to the organization shown in Figs. I and II of the drawings, 1 is a diagrammatic representation of a conventional form of pulverizing mill by which solid or lump coal is finely ground. After pulverization, the coal dust is fed by a conveyor screw 2, by way of a duct 3 to the main conduit 4 of the conveying system, said conveyor screw being continuously operated, through the medium of a belt connection 5, preferably by an electric motor 6. By aid of compressed air or other gas, the pulverized coal is conducted, in a manner hereinafter fully explained, to a storage bin 7 located adjacent a building 8 containing the apparatus which is to be supplied, in this instance, a series of smelting furnaces 9—9. The bin 7 is divided into a number of separate compartments 10—10 to which the pulverized fuel is individually conducted from the main conduit 4 through branch conduits 11—11 which rise vertically from said main conduit, as clearly shown in Fig. II, and discharge into the tops of the bin sections. From the several compartments of the bin 7, the fuel is in turn discharged by gravitation into the casings 12—12 of two underlying screw conveyors 13—13. Said conveyors are preferably made either right and left spirals, or driven in opposite directions by motors conventionally represented at 14—14, so that the fuel is uniformly distributed to a number of transverse auxiliary screw conveyors 15 which feed individually to conduits 16—16 leading to the furnaces 9—9. The compressed air used in effecting movement of the pulverulent material through the system is generated by a blower represented at 20 in Fig. I, and on a larger scale in Fig. III. This compressor is preferably directly driven by an electric motor 21 mounted with the same upon a common base 22. Associated with the blower 20 is a pulsator 23 which comprises a casing 24 having intersticed or slotted walls 25—25 between which operates a reciprocatory or vibratory slide 26 correspondingly intersticed or slotted as clearly indicated in Fig. III. The slide 26 of the pulsator is vibrated by an electric motor 27, also mounted on the base 22, through the instrumentality of an interposed speed reducing gear train 28 and crank rod connection 29, at the proper speed to produce the desired number of interruptions of the air or gas flow per unit of time. In practice, we have found that a frequency of about forty pulsations per minute serves very satisfactorily for the purpose under present consideration.

Leading from the pulsator 23 is a trunk 30 by which the compressed air or gas is conducted to a pipe 31 extending axially through the main conduit 4, the flow being controllable by a hand valve at 32. At regular intervals, the pipe 29 is pierced circumferentially by discharge outlets or ports 33, each group of such outlets or ports being surrounded by a conical deflector 35, see Fig. IV. This construction affords a series of nozzles 36, whereby the air emitted through the outlets or ports 33 is discharged in divergent blasts in a direction axially of the conduit to progress the pulverulent material therethrough.

In order that the pressure, temperature and volume of the air may be maintained constant between the conveying limits of the conduit, we provide a coextensive auxiliary equalizing or distributing pipe 37 which is connected to the air trunk 30 at 38, and serves to augment the supply of air in the nozzle pipe 31 through a number of angularly directed induction branches 39—39 arranged at intervals lengthwise of the conduit. The general flow of air through the auxiliary pipe 37 is controllable by a valve 40 and the augmentive flow through the branches 39—39 by individual valves 41—41.

Elevation of the material to the storage bin 7 through the vertical branches 11—11 of the main conduit 4 is effected in a manner similar to that already described by aid of nozzle pipes 45 which communicate with the axial pipe 31 of said conduit as clearly shown in Figs. I and II. Preferably with each elevating conduit is associated a valve controlled inductor branch 46, Fig. I, by which air is delivered direct from the auxiliary air main 31.

The axial nozzle pipes 47 of the conduits 16 by which the fuel is conducted to the several furnaces 9 are supplied with air by a common manifold or branch 48 connected to the auxiliary air pipe 31 at 49. Additional air necessary to the combustion of the fuel in the furnaces 9 is supplied from the manifold 48 through branches 50—50, which lead individually to the burners 51 and merge axially with the ends of the nozzle pipes 47 as shown in detail in Fig. V.

By pulsatory discharge of the air at uniform pressure at regular intervals lengthwise of the several conveyor conduits, it will be apparent that the pulverulent material discharged into the same at 3 will be dissipated throughout the volume of air contained in the zones between successive nozzles and advanced progressively from one to another of said zones in an undulatory or wave-like manner through the entire system. The divergent blasts, by virtue of impinging at an angle against the walls of the conduits, tend to reduce frictional tendencies along the line of travel of the material. This characteristic is, it will be readily perceived, of special importance in the case of elevating the material as in the branch conduits 11 leading to the storage bin 7. It will be noted that at the discharge end of the pipe 4 a number of the nozzles and connecting pipes 46 are placed in close succession so as to effect quick closely grouped pulsations in the pipe 4 which will have the effect to facilitate the segregation of the suspended material and its discharge through the conduits 11 into the bin.

Referring now to Fig. VI of the drawings, we have shown a modified form of conduit, which consists of two concentrically arranged pipes 60—61 separated by an annular interval 62 which serves as a channel for the air used in propulsion. The air escapes into the inner or conveying pipe 61 through angularly directed divergent discharge outlets 63—63, and effects progression of the material in a manner analogous to that already understood.

In the modification shown in Figs. VII and VIII, we insert at intervals within the conveying conduit 65, circular pipes 66—66 which are individually supplied with the compressed air under regulative control of valves 67—67 from a supply main or pipe 68. Extending laterally at an angle from the circular pipes 66 are the discharge nozzles 69—69. This form is especially suited to the conveyance of large volumes of extremely finely divided materials or dust laden gases.

In the form represented in Fig. IX, use is made of circular pipes 70, as in the previous embodiment, but, in this instance, said circular pipes are accommodated in annular, outwardly extending recesses 71 especially provided for them in the conduit 72. A further variation resides in provision of laterally disposed nipples 73—73, instead of the nozzles of the previous form, the choice being of course optional. Supply of the conveying medium is obtained from a common main 74 to which the circular pipes are connected with interposition of control valves 75. This type of conduit lends itself advantageously to systems where employment of free or atmospheric air is prohibitive, as, for example, in the conveyance of powdered fuel on account of possibilities of explosions due to the giving off of gas from the fuel. Instead, therefore, of using air, a quantity of the gas itself is compressed to serve as the propelling medium.

Fig. X shows the arrangement of nozzles 80 similar to those used in the first described embodiment of my invention in a conduit 81 through which the material being conveyed is conducted, in opposite directions, to a vertical connecting trunk or branch 82. Here it will be observed that the separate air pipes 83 and 84 are provided, the nozzles of the two pipes being set in opposition to each other. This arrangement is useful in the conveyance of blast furnace gases to a bin, tank or settling chamber. Maintenance of a pressure one eighth or quarter of an inch higher in the main conduit 81 than in the branch 82 through aid of the nozzles 80 prevents the formation of dangerous vacuum such as often occurs in blast furnace gas mains when excessive unequal pressures form for any reason.

Referring lastly to Fig. XI, we have there illustrated one other practical application of the fundamental principle of our invention. In this instance, intermittent blasts of compressed air are made use of in effecting movement of gases through a smoke stack for the purposes of controlling combustion to effect either acceleration or retardation. The showing per se is more especially for the latter purpose, and depicts more or less diagrammatically a drier or cement kiln, the drum 90 of which discharges into a settling chamber 91 communicating with an exhaust stack 92. Said stack is enveloped by a spaced concentric shell 93 affording an interspace 94 which serves as a pressure equalizing chamber for air under pressure supplied through a valve controlled pipe connection 95. The air from the interspace 94 enters the stack through downwardly inclined ducts or orifices 96, and serves to retard the draft, and incidentally separates the suspended solid matter from the products of combustion for precipitation into the settling chamber. If combustion is to be accelerated, this may be accomplished by directing the orifices upwardly instead of downwardly as shown.

Having thus described our invention, we claim:

1. The method of conveying finely comminuted solids which consists in effecting transfer through a closed conduit by aid of compressed air or other gas intermittently discharged within the conduit at intervals lengthwise of the same.

2. The method of conveying finely comminuted solids which consists in effecting transfer through a closed conduit by aid of compressed air or other gas intermittently discharged in divergent, axially directed blasts, within the conduit at intervals lengthwise of the same.

3. A conveying system for finely comminuted solids comprising a conduit with a pipe for compressed air or other gas extending axially therethrough, said pipe having, at intervals lengthwise thereof, groups of circumferentially extending outlet ports, and conical deflectors surrounding the pipe at the regions of said ports for directing the discharge from the latter in divergent blasts axially of the conduit to effect progression of the materials through the same.

4. A conveying system for finely comminuted solids comprising generating means for producing an intermittent flow of compressed air or other gas; a conveyor conduit having within it at intervals lengthwise thereof, nozzles for directing the intermittent flow of compressed air or gas, delivered from the generating means aforesaid, in divergent blasts axially of the conduit to effect progression of the materials with an undulatory or wave-like motion therethrough.

5. A conveying system for finely comminuted solids, including a main material conveying conduit, a compressed air pipe enclosed therein having nozzles to discharge axially, receiving bins, branched conduits for conveying material from said main conduit to the bins, branch compressed air pipes in said branch conduits coupled to the first mentioned pipe, discharging conduits extending from the bins to the place of utilization of the material, and compressed air pipes in said discharge conduits, having nozzles to discharge axially thereof.

6. A conveying system for finely comminuted solids, including a main material conveying conduit, branch conduits leading therefrom, a main compressed air pipe enclosed by the main conduit and having nozzles to discharge axially toward said branching conduits, branch pipes coupled to the main pipe enclosed by the branch conduits and containing nozzles to discharge axially thereof, an auxiliary air supply pipe, and a plurality of closely spaced branches of said auxiliary pipe extending to the main air pipe, and means to introduce air intermittently through said pipes to promote segregation of the material and discharge of the same through said branch conduits.

7. A conveying system for finely comminuted solids, including a material conduit and compressed air pipe enclosed therein having nozzles to discharge axially of the conduit, an air compressor and connection to said pipe, a valve casing interposed in said connection having a series of openings controlling said connection, a sliding valve having openings for registration with said first mentioned openings, and means to reciprocate the valve to permit the passage of air into the connection in a series of impulses.

8. A conveying system comprising a material conduit, a pipe extending axially therethrough having jet openings at intervals, an auxiliary pipe extending exteriorly of the conduit, branches connecting said auxiliary pipe with the first mentioned pipe to supply additional air thereto at intervals, and means for intermittently forcing air into both pipes so as to convey the material by a series of pulsations.

9. In a pneumatic conveyor, a pipe having an annular series of openings in its wall, and a conical member surrounding the pipe with its smaller end engaging the pipe adjacent the openings to deflect air issuing from said openings to direct the air laterally in a divergent stream.

In testimony whereof, I have hereunto signed my name, at Allentown, Pennsylvania, this 18th day of February, 1922.

ROBT. W. P. HORN.

Witnesses:
CHAS. L. WALTERS,
B. M. DICKERT.

In testimony whereof, I have hereunto signed my name at Manheim, Pennsylvania, this 21st day of February, 1922.

JACOB H. NISSLEY.

Witnesses:
MARION E. THUMA,
K. T. FISHER.